Oct. 18, 1960
A. DAMIJONAITIS
2,956,811
CHUCK
Filed Nov. 15, 1956
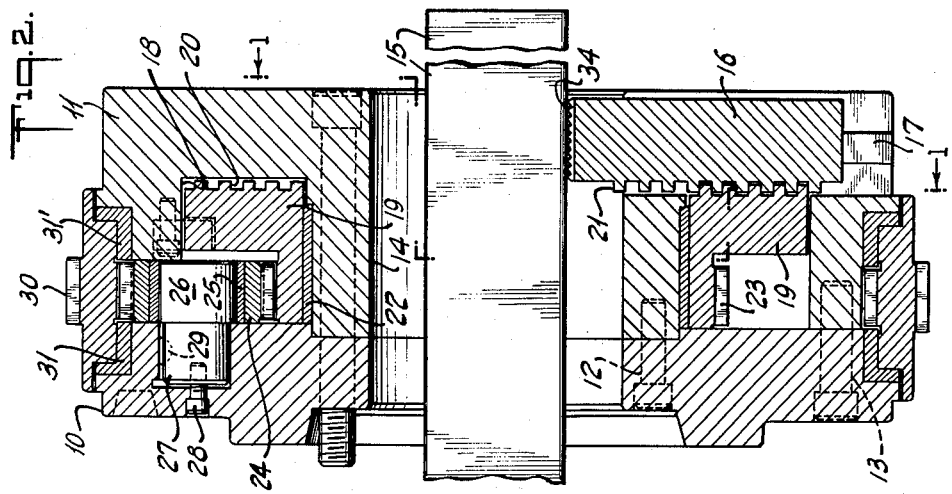
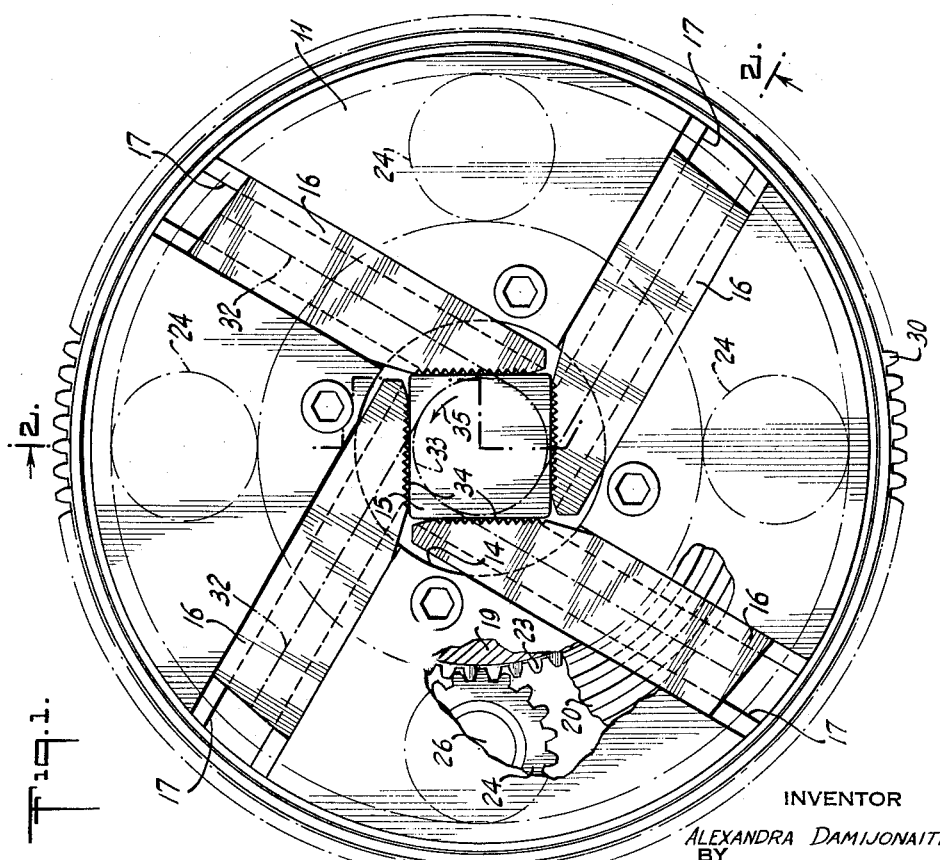
INVENTOR
ALEXANDRA DAMIJONAITIS
BY
*Mitchell & Bechert*
ATTORNEYS

# United States Patent Office 2,956,811
Patented Oct. 18, 1960

2,956,811
CHUCK

Alexandra Damijonaitis, Newington, Conn., assignor to Union Manufacturing Company, New Britain, Conn., a corporation of Connecticut Filed Nov. 15, 1956, Ser. No. 622,302

2 Claims. (Cl. 279—123)

My invention relates to a chuck particularly adapted to the support of polygonal stock.

It is an object of the invention to provide an improved chuck of the character indicated.

It is another object to provide an improved chuck in which stock-gripping action may be enhanced, particularly when polygonal stock is chucked.

It is also an object to provide an improved chuck in which chuck-jaw action may be optimized for the direction of torque reaction encountered when performing a cut on stock supported by the chuck.

A specific object is to meet the above objects with a chuck construction having a number of jaws corresponding to the number of sides of the stock (or to a submultiple of the number of sides of the stock) and exhibiting superior chucking action for such stock.

Another specific object is to provide an improved chuck in which polygonal stock may be automatically oriented correctly as the jaws close to chucking position.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 1 is a front view of a chuck incorporating features of the invention, with parts broken away and shown partly in section, the section being taken generally along the lines 1—1 of Fig. 2; and Fig. 2 is a sectional view taken substantially along the lines 2—2 of Fig. 1.

Briefly stated, my invention contemplates an improved chuck organization, particularly suited to the efficient chucking of polygonal stock. Preferably, the number of jaws on the chuck conform with the number of faces on the stock to be chucked; for stock having a large number of faces, e.g. hexagonal or octagonal stock, the number of jaws on the chuck may be a submultiple of the number of faces to be engaged. An improved chucking action is realized by angularly offsetting the axes of jaw movement so as to converge on the chucking axis with a skew, that is, angularly offset from strictly radial convergence. The net effect is to guide each jaw on a path tangent to what might be termed the mean chucking circle. If the direction of angular offset for jaw movement is opposite to the direction of torque reaction (developed when performing a cutting operation on chucked stock), then vastly enhanced chucking action is realized.

Referring to the drawings, my invention is shown in application to a chuck suitable for mounting on a lathe spindle. The chuck is shown to comprise a body having two parts 10—11, tied together by plural bolts 12—13. Both parts of the body 10—11 are annular so as to define a central opening 14 within which an elongated piece of stock 15 is to be received for chucking. As explained above, the stock 15 may be polygonal and, in the form shown, it is of square section, thus necessitating the employment of four jaws 16 for the chuck shown. Each of these jaws may be of any desired type, as for example, one of the American Standard types, and be guided in suitable ways 17, milled in the front face of the body part 11.

The body part 11 may be internally recessed at 18 to accommodate an actuating ring member 19, having a scroll 20 facing and engaging teeth 21 on the back side of all jaws 16. The ring 19 is shown riding a bearing 22 and includes a gear-toothed portion 23 meshing with one or more idlers 24. Each idler 24 rides a bushing 25 on a fixed stud or pin 26. The pin 26 is shown having a reduced end portion 27 received within a bore in the body part 10 and secured therein by bolt means 28. A key 29 holds the stud or pin 26 against rotation. Finally, power drive to the idler 24 may be applied by way of an external ring gear 30 riding bearing means 31—31' in the chuck body 10—11 and facing externally for engagement with manual or power drive means (not shown).

In accordance with the invention, the jaw-guiding axes 32 all converge generally radially toward the chucking axis, but they are angularly offset or skewed from a strictly radial alignment. The direction of angular offset or skew for each of the axes 32 is preferably by the same amount and in the same angular direction, so that for any particular size of stock to be accommodated, the axes 32 may all be said to be tangent to the same circle 33 about the chucking axis; this circle 33 may, for convenience, be termed the mean chucking circle. The chucking faces 34 of the jaws 16 are preferably essentially flat and are inclined at an acute angle to the jaw-guiding axes. For the form shown, this angle is of the order of 30°, meaning that the jaw-guiding axis 32 for each jaw is at substantially 60° to a normal to the work-gripping surface 34, but it will be understood that depending on the specific application requirements this angle may be greater or less than that shown. The direction of angular offset of the jaw-guiding axes 32 is preferably opposite to the direction of torque reaction, encountered when cutting the chucked stock. Such reaction-torque direction is indicated by the arrow 35 in Fig. 1.

As indicated above, the stock-gripping or chucking faces 34 of the jaws 16 are formed at an acute angle to the jaw-guiding axes. This relationship permits the jaws to perform an orienting function on the stock as chucking takes place. Thus, when the jaws are open to receive a piece of polygonal stock, the stock faces may not be oriented parallel with the jaw faces 34 by which they are to be chucked. In that event, it will be appreciated that as each jaw becomes engaged with a part of the stock during chucking, the inward movement of the jaw faces 34 is accompanied by angular displacement about the chucking axis, thus imparting angular (orienting) displacement to the stock. The extent of such orienting displacement for the full movement of the jaws will be understood to sufficiently partially rotate even the worst case of poor initial stock orientation, so that by the time the jaws have fully closed on the stock, the stock is oriented for greatest area of jaw grip on each face of the stock.

It will be seen that I have described an improved chuck construction featuring enhanced chucking action, particularly for polygonal stock. The number of jaws preferably conforms to the number of faces or to a submultiple of the number of faces of the stock to be engaged, and, for the actuating mechanism shown, the principle of the invention is applicable regardless of the number of jaws provided. Chucking action not only is such as to optimize the grip on the stock in accordance with the direction of reactional torque due to performing work on the stock, but also the acute angle of contact of the jaws with the work surfaces is such as to promote firmer grip on the stock. Preferably, the work-gripping surfaces 34 of the jaws are roughened, as shown, so as to promote even greater grip on the stock.

While the invention has been described in considerable detail and a preferred form illustrated, it is to be understood that various changes may be made within the scope of the invention as defined in the appended claims.

I claim:

1. In a chuck for supporting polygonal stock on a central chucking axis, a chuck body surrounding said axis, separate jaw guides in said body at equal angularly spaced locations about said axis, each of said guides being inclined at the same acute angle to a radius from said axis, a jaw movable in each guide, all said jaws having like working surfaces at the front end thereof, said working surfaces being formed for extensive generally parallel contact with the stock face to be engaged and in each case extending on both sides of the jaw axis, and actuating means carried by said body for all jaws in unison, the inwardly directed projections of all jaws being offset from said axis, whereby due to said offset and due to said extensive working surfaces a maximum range of polygonal stock sizes may be accommodated by said chuck.

2. A chuck according to claim 1, in which said actuating means includes a scroll rotatable in said body about said axis and meshing with all said jaws for moving the same upon rotation of said scroll, an idler gear in said body, said scroll meshing with said idler, and an annular circumferential gear on said body and meshing with said idler for rotating the same and said scroll upon rotation of said annular gear on said body.

References Cited in the file of this patent

UNITED STATES PATENTS

| | | |
|---|---|---|
| 1,370,943 | Boyd et al. | Mar. 8, 1921 |
| 1,784,908 | Regan | Dec. 16, 1930 |
| 2,460,254 | Greer | Jan. 25, 1949 |
| 2,575,662 | Highberg | Nov. 20, 1951 |
| 2,686,058 | Zetterberg | Aug. 10, 1954 |
| 2,757,008 | Lane | July 31, 1956 |
| 2,777,703 | Pickett et al. | Jan. 15, 1957 |

FOREIGN PATENTS

| | | |
|---|---|---|
| 495,582 | Germany | Apr. 9, 1930 |
| 426,782 | Great Britain | Apr. 9, 1935 |